(No Model.)

M. L. KNOWLES.
TWO WHEELED VEHICLE.

No. 347,490. Patented Aug. 17, 1886.

WITNESSES:
Fred G. Dieterich
Edw. W. Byrn.

INVENTOR:
M. L. Knowles
BY Munn & Co
ATTORNEYS.

UNITED STATES PATENT OFFICE.

MORTIMER L. KNOWLES, OF UNION CITY, MICHIGAN, ASSIGNOR OF TWO-THIRDS TO JOHN J. BANFORD AND CHARLES A. ZIMMERMAN, OF SAME PLACE.

TWO-WHEELED VEHICLE.

SPECIFICATION forming part of Letters Patent No. 347,490, dated August 17, 1886.

Application filed June 19, 1886. Serial No. 205,692. (No model.)

*To all whom it may concern:*

Be it known that I, MORTIMER L. KNOWLES, of Union City, in the county of Branch and State of Michigan, have invented a new and useful Improvement in Road-Carts, of which the following is a specification.

My invention relates to certain improvements in that form of road-cart in which the shafts are attached to a single axle sustained upon two wheels, and the seat is sustained upon a rearwardly-projecting curved bar, whose two front ends are connected to the shafts and are supported by springs in rear of said connection, and have also a suspended foot-rest.

My improvement consists in the peculiar construction and arrangement of these parts designed to secure lightness, symmetry, strength, and relief from the horse motion, which I will now proceed to describe.

Figure 1:
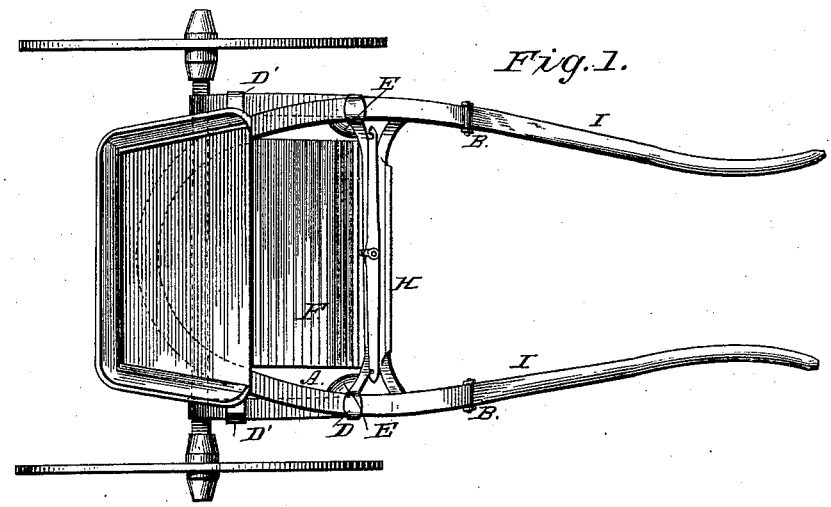
Figure 2:
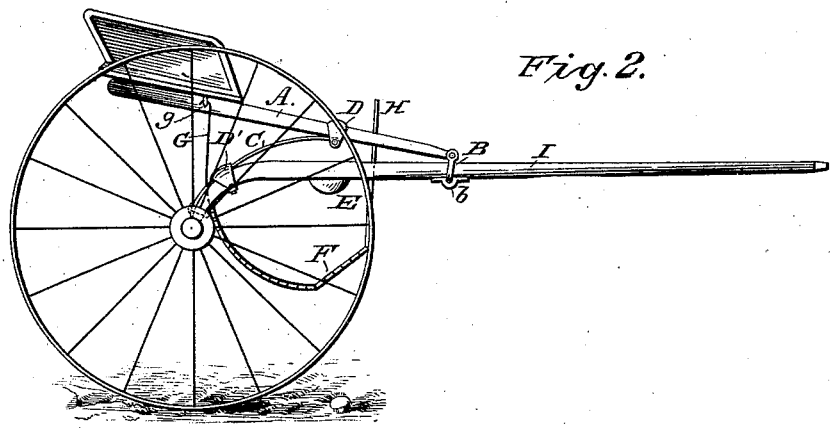

Figure 1 is a plan view, and Fig. 2 a side elevation.

The axle is mounted upon wheels and connected to the shafts I I in the usual manner.

A is the seat-bar, which is made of a single piece bent around into a semicircle, and has the seat mounted upon said bend, while its two ends are carried forward to positions above and parallel with the shafts, and are connected thereto by oscillating stirrup B, which embraces the shafts and rocks in bearings $b$, attached to the under side of the shafts. This connection permits the forward ends of the seat-bar to have a back-and-forth motion above the shafts. A short distance back of this connection there is attached to each side of the seat-bar a clip, D, having a hinged or jointed connection on the under side with the forward end of a leaf-spring, C, whose rear end is rigidly fastened by a clip, D', to the bend of the shaft. These springs C serve to sustain the seat-bar in an elastic manner. The clips D are made adjustable on the bar A, and the stirrup B and its bearing $b$ are made adjustable along the shaft, so as to vary the distance between the clip D and the stirrup B, which provision permits the leverage of the seat-bar A on the spring to be varied, to adapt it to the different weights of different drivers.

H is the dash-board.

F is the suspended foot-rest, which is made in slotted form and suspended at its front end from the cross-bar of the shafts, and at its rear ends is provided on each side with hooked rods G, that fasten into eyes $g$ on the seat-bar. The foot-rest is thus made detachable, to permit the cart to be used as a trotting-sulky for speeding.

E is the foot-brace, against which the feet are placed in speeding when the suspended foot-rest is removed.

The combination of parts, as thus described, give an easy-riding vehicle, with little or no horse motion, for the reason that the seat not only has an up-and-down motion, but the jointed connection of spring C and the oscillating stirrup B permit the seat and its supporting-bar to have also a forward-and-backward movement. The movable foot-rest converts it into an exercising or speeding cart, and as the bearing is all on the shafts through the springs at a point near the axle, the cross-bar can be made lighter and the whiffletree set higher, giving room to hook the horse closer to the axle for speeding.

Having thus described my invention, what I claim as new is—

1. In a road-cart, the combination, with the shafts, of a pair of springs rigidly fastened to the bends of the shafts near the axle and projecting forward above said shafts, a rearwardly-projecting seat-bar having its forward ends loosely connected to the shafts so as to oscillate, and having back of this point clips connected to the forward end of the springs by hinge-joints, substantially as and for the purpose described.

2. The combination, with the shafts and the rearwardly-projecting seat-bar, of the detachable foot-rest F, hung at its forward end to the cross-bar of the shafts, and having at its rear ends the hook-rods G, fastened with eyes $g$ on the seat-bar, substantially as and for the purpose described.

3. The combination, with the shafts I, springs C, and seat-bar A, of the adjustable clips D and the adjustable stirrup and bearings B $b$, as and for the purpose described.

MORTIMER L. KNOWLES.

Witnesses:
J. W. McCAUSEY,
G. H. SEYMOUR.